F. P. McBERTY.
OIL RING RETAINER.
APPLICATION FILED OCT. 21, 1908.
928,784.
Patented July 20, 1909.
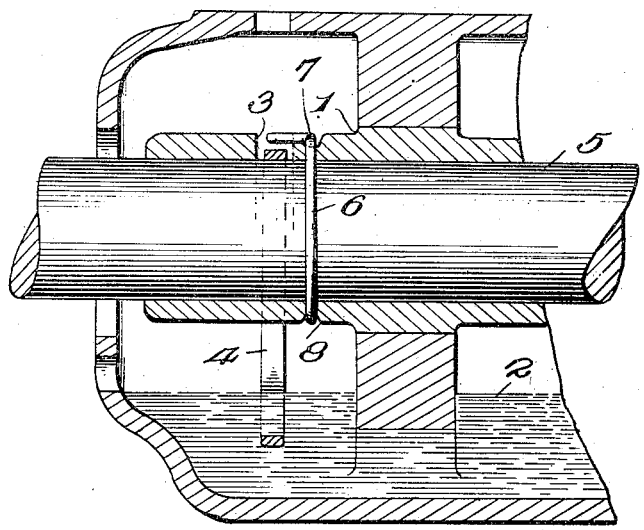
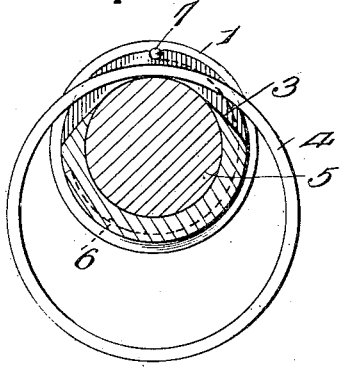
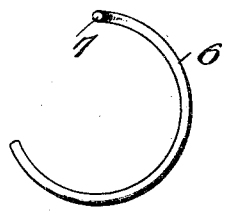
Witnesses
John A. Murphy
Frank S. Maguire
Inventor
F. P. McBerty
By
Attorney

UNITED STATES PATENT OFFICE.

FRED P. McBERTY, OF WARREN, OHIO, ASSIGNOR TO THE PEERLESS ELECTRIC COMPANY, OF WARREN, OHIO, A CORPORATION OF OHIO.

OIL-RING RETAINER.

No. 928,784.  Specification of Letters Patent.  Patented July 20, 1909.

Application filed October 21, 1908. Serial No. 458,896.

*To all whom it may concern:*

Be it known that I, FRED P. McBERTY, of Warren, in the county of Trumbull and State of Ohio, have invented certain new and useful Improvements in Oil-Ring Retainers; and I do hereby declare the following to be a full, clear, and exact description of the invention, such as will enable others skilled in the art to which it appertains to make and use the same.

The object of this invention is to provide a simple device for retaining a shaft lubricating ring in position, such device being capable of being readily removed to allow of the withdrawal or positioning of the ring.

The invention will be hereinafter fully set forth and particularly pointed out in the claims.

In the accompanying drawings, Figure 1 is a vertical longitudinal section of a shaft bearing, showing my improvement. Fig. 2 is a transverse sectional view, with parts omitted. Figs. 3 and 4 are, respectively, front and side elevations of the retainer.

Referring to the drawings, 1 designates a shaft bearing such as is ordinarily used in electric motors and generators. This bearing is shown as having an oil reservoir 2 and a cut-out 3 to accommodate oil ring 4, which latter is supported by shaft 5 and extends into the oil within the reservoir.

The ring retainer 6 is shown as composed of a single spring wire rod curved to conform to the curvature of the shaft-bearing at a point adjacent to cut-out 3, and to extend slightly more than half way around the bearing so as to be self sustaining. This rod is also bent at right angles to itself, as at 7, such bent portion extending transversely of and across the oil ring so as to retain the latter in proper position. To form a seat for this retainer I preferably provide a groove or recess 8 in the shaft bearing.

The advantages of my invention will be readily appreciated. It will be seen that the retainer is composed of but a single piece of metal capable of being readily bent into the desired shape, and that it will be self-sustaining on the bearing and at the same time capable of being readily placed in or removed from its normal position.

I claim as my invention:

1. In combination with a lubricating ring, a retainer therefor consisting of a spring wire rod bent to form approximately slightly more than a half circle, and having at one end a lateral projection designed to extend transversely across the lubricating ring.

2. In combination with a shaft, a bearing therefor, and an oil reservoir, of a lubricating ring supported by said shaft, and a retainer consisting of a spring wire rod bent to engage the bearing and be self retained thereon and also bent at right angles to extend transversely across the lubricating ring.

3. In combination with a shaft, a bearing therefor having a groove, and an oil-reservoir, of a lubricating ring supported by the shaft and a retainer for said ring consisting of a wire formed to fit in said groove and having a portion extended transversely of the ring.

In testimony whereof, I have signed this specification in the presence of two subscribing witnesses.

FRED P. McBERTY.

Witnesses:
J. B. ESTABROOK,
W. C. WARD.